3,272,846
PROCESS FOR PRODUCING PHOSPHINYL AZIDES
Kazimiera J. L. Paciorek and Reinhold H. Kratzer, Costa Mesa, Calif., assignors to American Potash & Chemical Corporation, Los Angeles, Calif., a corporation of Delaware
No Drawing. Filed June 8, 1965, Ser. No. 462,422
6 Claims. (Cl. 260—349)

The present invention relates to phosphorus compounds and has particular reference to phosphinyl azide compounds.

Prior to the present invention, considerable difficulty was experienced in producing phosphinyl azide compounds. In particular, difficulty was experienced because of the particular purification procedures employed. Often, such procedures resulted in the degradation of the azide product.

These and other disadvantages of the prior art have been overcome or at least substantially minimized by this invention. Thus, it now is possible to prepare phosphinyl azides, in high yields, by admixing and reacting a phosphinyl halide and a silyl azide for a period of time sufficient to produce a phosphinyl azide.

The phosphinyl azide products of the reaction of this invention enjoy wide utility. For example, these azides may be used as azide sources in synthetic reactions, as starting materials in the preparation of linear phosphonitriles, as oxidizing agents, as blowing agents, and the like.

The silyl azide reactant used in the process of this invention can be prepared by the procedure described by R. West and J. S. Thayer, J. Am. Chem. Soc., 84, 1763 (1962) or W. Sundermeyer, Chem. Ber., 96, 1293 (1963).

The phosphinyl halide reactant employed in the process of this invention may be prepared by the oxidation of the corresponding phosphinous halide with phosphorus pentoxide and chlorine.

In general, the phosphinyl azide products of this invention are prepared by an exchange reaction which comprises admixing and reacting a disubstituted phosphinyl halide having the formula:

$$R_2P(O)X$$ 

and a trisubstituted silyl azide having the formula:

$$R_3SiN_3$$ 

The said exchange reaction is carried out at a temperature between the boiling and freezing points of the reaction admixture for a period of time sufficient to produce the desired disubstituted phosphinyl azide. The phosphinyl azide product is represented by the formula:

$$R_2P(O)N_3.$$ 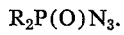

The R substitutents in the formulas given above for the disubstituted phosphinyl halide and the trisubstituted silyl azide reactants, and the disubstituted phosphinyl azide product comprise hydrocarbon groups selected from the class consisting of lower alkyl groups having from 1 to 5 carbon atoms, and phenyl and lower alkyl substituted phenyl groups having from 7 to 10 carbon atoms. The halogen group in the disubstituted phosphinyl halide reactant may be either chlorine or bromine.

Surprisingly, the exchange reaction proceeds to completion over a relatively wide range of temperatures. In many cases the reaction can be carried out at temperatures as low as −150° C. or even lower. Usually, the reaction is carried out at somewhat higher temperatures, for example, at from about 20° C. to 80° C. Higher temperatures may be used as desired or as conditions may require, for example, up to about 150° C. or higher depending, for instance, upon the particular reactants and solvents employed.

The exchange reaction may be carried out at super-or-subatmospheric pressures when desired. However, since the reactants are quite volatile it is often more convenient to carry out the reaction at super-atmospheric pressures.

The exchange reaction of this invention is considered to be complete when substantially all of one or both of the reactants has been consumed. This period of time ranges from about 10 minutes or less to about 24 hours or more depending, for instance, upon the particular reactants and reaction temperatures employed.

The exchange reaction of this invention can be carried out in the presence or absence of a liquid reaction medium, more particularly a solvent. When a liquid reaction medium is used the liquid must be sufficiently inert to not affect adversely the course of the reaction or the composition of the reaction product. Suitable liquid reaction media include, for example, dialkyl ethers such as diethyl ether and diisopropylether; cyclic ethers such as tetrahydropyran; alkylnitriles such as acetonitrile, hydrocarbons such as benzene, toluene, xylene, naphthalene and cyclohexane; and the like.

When a liquid reaction medium is employed it generally should be used in an amount ranging from about 0.1 to 100 or more times that of the combined weight of the phosphinyl halide and silyl azide reactants. Preferably the liquid reaction medium is so chosen that its physical properties facilitate its removal from the reaction product upon completion of the reaction. Such physical properties include volatility, melting point, crystallization characteristics, solubility and the like.

The molar proportions of the reactants may be varied considerably. Ordinarily, however, the phosphinyl halide and the silyl azide should be employed in approximately equal molar proportions. When desired it is possible to carry out the exchange reaction employing either one or the other of these reactants in amounts several hundred times or more in excess of equal molar proportions.

Illustrative examples of the hydrocarbon groups R, appearing in the formulas for the phosphinyl halide, silyl azide and phosphinyl azides include, for example, methyl, ethyl, propyl, isopropyl, butyl, isobutyl, amyl, isoamyl, neopentyl, phenyl, tolyl, xylyl, ethylphenyl, propylphenyl, isopropylphenyl, butylphenyl and the like groups.

The phosphinyl azides produced by the exchange reaction of this invention can be recovered for example, as liquids, solids, solutions of the product dissolved in a suitable solvent, solid precipitates and the like. The recovered azides can be isolated by any conventional isolation procedures such as crystallization, filtration, distillation or the like.

In order that those skilled in the art may better understand how the present invention can be carried into effect, the following specific examples are set forth. These examples are given by way of illustration and not by way of limitation. All parts and percentages are by weight unless otherwise indicated.

*Example*

This example is illustrative of the reaction of a phosphinyl halide with a silyl azide in the absence of a solvent to produce a phosphinyl azide.

To $(C_6H_5)_2P(O)Cl$ (432.3 mg., 1.8263 mmoles) in an ampoule in vacuo at liquid nitrogen temperature is added $(CH_3)_3SiN_3$ (267.8 mg., 2.3245 mmoles). Subsequently, the ampoule is sealed and the contents heated in an oil bath at 58° C. for 12 hours. The ampoule then is cooled again in liquid nitrogen, opened and the volatiles are distilled, initially at room temperature, then at 50° C. into a liquid nitrogen cooled trap. Pure diphenylphosphinyl azide $(C_6H_5)_2P(O)N_3$ remains in the ampoule. It is identified by the comparison of its infrared spectrum with that of an authentic sample and by elemental analysis.

*Analysis.*—Calculated for $C_{12}H_{10}PON_3$: C, 59.26; H, 4.14; P, 12.74; N 17.28. Found: C, 59.23; H, 4.07; P, 12.80; N, 17.50.

The distillate is fractionated in vacuo and yields $$(CH_3)_3SiN_3$$

53.5 mg.; 0.4645 mmole and $(CH_3)_3SiCl$ 202.2 mg., 1.8610 mmoles. Ratio: $(C_6H_5)_2P(O)Cl$: $(CH_3)_3SiN_3$ consumed: $(CH_3)_3SiCl$ formed=1.00:1.02:1.02.

Repetition of this example replacing the $$(C_6H_5)_2P(O)Cl$$

with $(CH_3)_2P(O)Cl$ and the $(CH_3)_3SiN_3$ with $$(C_6H_5)_3SiN_3$$

results in very high yields of $(CH_3)_2P(O)N_3$. Repetition of this example replacing the $(C_6H_5)_2P(O)Cl$ with $(C_3H_7)_2P(O)Br$ produces $(C_3H_7)_2P(O)N_3$. Likewise the substitution of $(CH_3C_6H_4)_2P(O)Cl$ for the $$(C_6H_5)_2P(O)Cl$$

produces high yields of $(CH_3C_6H_4)_2P(O)N_3$.

This example is repeated using a reaction temperature of 100° C. instead of 58° C. The reaction time is substantially reduced, however, the yield of $(C_6H_5)_2P(O)N_3$ is reduced somewhat.

As will be understood by those skilled in the art what has been described are the preferred embodiments of the invention. However, many modifications, changes and substitutions can be made therein without departing from the scope and spirit of the invention as defined in the following claims.

What is claimed is:

1. A process for preparing phosphinyl azides which comprises: admixing and reacting at a temperature of from about −15° C., to 150° C. a phosphinyl halide having the formula $R_2P(O)X$, and a silyl azide having the formula $R_3SiN_3$, for a period of time sufficient to produce a phosphinyl azide having the formula $R_2P(O)N_3$, wherein each R is a hydrocarbon group selected from the class consisting of lower alkyl groups containing from 1 to 5 carbon atoms, phenyl, and lower alkyl substituted phenyl groups containing from 7 to 10 carbon atoms, and X is a halogen selected from the group consisting of chlorine and bromine, and recovering said phosphinyl azide.

2. The process of claim 1 wherein said R is phenyl.

3. The process of claim 1 wherein said R is methyl.

4. The process of claim 1 wherein said silyl azide is triphenylsilyl azide.

5. The process of claim 1 wherein said silyl azide is trimethylsilyl azide.

6. the process of claim 1 wherein said phosphinyl halide is dimethylphosphinyl chloride.

No references cited.

WALTER A. MODANCE, *Primary Examiner.*
ROBERT T. BOND, *Assistant Examiner.*